United States Patent [19]

Tyrell

[11] Patent Number: 4,560,722

[45] Date of Patent: Dec. 24, 1985

[54] STABILIZED (POLY)ESTER/(POLY)CARBONATE BLEND

[75] Inventor: John A. Tyrell, Mount Vernon, Ind.

[73] Assignee: General Electric Company, Pittsfield, Mass.

[21] Appl. No.: 644,781

[22] Filed: Aug. 27, 1984

[51] Int. Cl.[4] .......................... C08K 3/38; C07C 68/08
[52] U.S. Cl. ...................................... 524/405; 260/463
[58] Field of Search ................ 524/405; 525/439, 444, 525/339; 260/463

[56] References Cited

U.S. PATENT DOCUMENTS

| | | | |
|---|---|---|---|
| 2,437,232 | 3/1948 | Rothrock et al. | 528/308 |
| 3,321,435 | 5/1967 | Fritz et al. | 524/405 |
| 3,594,448 | 7/1971 | Birenzvige et al. | 524/291 |
| 3,595,936 | 6/1971 | Birenzvige et al. | 524/291 |
| 3,642,689 | 2/1972 | Stewart | 524/405 |
| 3,819,759 | 6/1974 | Weaver et al. | 525/439 |
| 3,953,539 | 4/1976 | Kawase et al. | 524/537 |
| 3,998,908 | 12/1976 | Buxbaum | 524/537 |
| 4,107,149 | 8/1978 | Bier et al. | 524/605 |
| 4,257,937 | 3/1980 | Cohen et al. | 525/146 |

FOREIGN PATENT DOCUMENTS 2710729  9/1977  Fed. Rep. of Germany .

OTHER PUBLICATIONS

J. Devaux et al.: J. Polymer Science Polymer Physics Edition, vol. 20, 1875–1880, (1982).
E. A. Joseph et al., "Boiling Water Aging of a Miscible Blend of Polycarbonbate and a Copolyester" *J. Applied Polymer Science*, vol. 27, 4807–4819, (1982).
D. C. Wahrmund et al., "Polyester Polycarbonate Blends I, Poly(butyleneterephthalate)", *J. Applied Polymer Science*, vol. 22, 2155–2164, (1978).
T. R. Nassar et al., "Polyester Polycarbonate Blends, II, Poly(ethylene terephthalate)", *J. Applied Polymer Science*, vol. 23, 85–99, (1979).

*Primary Examiner*—Veronica P. Hoke
*Attorney, Agent, or Firm*—Hedman, Gibson, Costigan & Hoare

[57] ABSTRACT

Compositions comprising a diester or polyester, e.g., 1,4-butylene dibenzoate or poly(1,4-butylene terephthalate) in combination with an organic carbonate or polycarbonate, e.g., diphenyl carbonate or poly(bisphenol-A carbonate), are stabilized with boric acid.

16 Claims, No Drawings

STABILIZED (POLY)ESTER/(POLY)CARBONATE BLEND

This invention relates generally to di- and poly-ester compounds and di- and polycarbonate compounds, and more particularly to methods for stabilizing such compounds in combination.

BACKGROUND OF THE INVENTION

Polyester resins derived from terephthalic acid and reactive derivatives thereof, such as dimethyl terephthalate, and alkanediols of from, e.g., 2 to 10 inclusive carbon atoms, e.g., ethylene glycol and 1,4-butanediol as well as related diols, such as cyclohexane dimethanol, and mixtures of such resins, have been known for some time and have become important constituents in injection moldable compositions. Workpieces molded from such polyester resin compositions, alone, or combined with reinforcements, offer a high degree of surface hardness and abrasion resistance, high gloss and lower surface friction. More recently, blends of such polyester resins with one or more second resins have become of significant commercial interest because such second resins, carefully selected, can greatly improve impact strength, as well as tensile strength, modulus and distortion temperature under load in parts molded from such compositions. Such second resins can comprise aromatic polycarbonate resins, alone, or in further combination with other resins, such as polyacrylate resins. See, for example, Cohen and Dieck, U.S. Pat. No. 4,257,937.

One major problem in producing such blends, however, is that of chemical incompatibility under the typical, but harsh, thermal processing conditions. This is known to lead to variability in the final fabricated articles, e.g., injection molded parts. The problem seems to be related to a known type of ester interchange between esters and carbonates. See, e.g., J. Devaux, P. Godard, and J. P. Mercier, West German Patent Publication No. 27-10-729, Sept. 22, 1982, who stabilized polycarbonate - poly(1,4-butylene terephthalate) blends with phosphites, especially di-n-octadecylphosphite and tri-phenyl phosphite. In the case of the aforesaid blend, the effect of the interchange can easily be seen by changes in the melting point. As the ester-carbonate exchange process becomes more pronounced, the crystalline melting point (Tm) of the poly(1,4-butylene terephthalate) decreases. Simpler compounds, e.g., diesters of organic acids and reaction products of phosgene or a phosgene precursor with mono-ols, such as diphenyl carbonate also undergo such interchange, but in these cases, heating yields increasing amounts of by-products, such as phenyl benzoate, as the ester exchange proceeds, and measurement of by-product evolution becomes the method of choice for following the reaction. In any event, the use of phosphites as stabilizers is not entirely satisfactory because they have a tendency to be unstable to both hydrolysis and oxidation thereby often giving irreproducible and unreliable results.

It has now been discovered that a specific inorganic boron compound, namely, boric acid, is highly effective to stabilize such ester/carbonate compositions. Boric acid, a rather innocuous midly acidic reagent, is stable and can be used in various manners, including prior incorporation as a concentrate in the ester compound, or at an appropriate level in the carbonate compound. In addition to the high degree of reliability as stabilizers in such compositions, boric acid does not deterimentally affect any of the components in the compositions, especially resinous components, e.g., polyesters or polycarbonates.

Under some interpretations of the state of the art, one might conclude (i) that the use of boric acid is unpatentably obvious, and (ii) the interaction problem does not exist absent the application of elevated temperatures, and therefore claims which do not call for heat do not distinctly point out an invention. Both such conclusions would be erroneous.

As to (i), although Fritz, et al., U.S. Pat. Nos. 321,435; Cohen, et al., 4,257,937, and Nassar, et al., J. Appl. Polymer Science, Vol. 23, 85–99 (1979), might imply that there is no ester interchange reaction between polyesters and polycarbonates, and therefore boric acid functions by some other mechanism than that which is claimed, and for such stabilization boric acid is prima facie obvious, other, more authoritative sources do establish that thermally-induced ester interchange does occur, for example Doerr, U.S. Pat. Nos. 3,752,866, cited in Kawase, et al., 3,953,539, and two affidavits filed in the Official Patent Office File of Kawase, et al. on Feb. 28, 1975 and Aug. 25, 1975, respectively. Attention is also directed to Seymour, et al., U.S. Pat. No. 4,088,709. In any event, nothing in the prior art will show that boric acid has ever been used before to prevent ester interchange between polyesters and polycarbonates. Moreover, its use for this purpose is patentably unobvious because Kawase, et al. found that phosphorus compounds were uniquely effective to prevent such interchange for butylene terephthalate resins, but not for ethylene terephthalate resins whereas as will be shown in the examples hereinafter, particularly Example 5, boric acid reduces ester interchange with 2-carbon alkylene esters, as well as 4-carbon alkylene esters (Example 1). These facts demonstrate conclusively that boric acid unexpectedly provides a wider range of compositions stabilized against thermally-induced ester interchange reactions.

Especially difficult to melt stabilize are combinations of polyester resins with polycarbonates and third resins such as polyacrylates, as well as flame retarded blends of polyesters and polycarbonates. Such formulations are rendered unprecedentedly melt stable with boric acid, according to the present invention. In addition to the specific instances noted above, stabilization can also be induced in other combinations of polyesters and other resins, especially those in which an active catalyst was used to prepare one or all of the polymers in the blend.

SUMMARY OF THE INVENTION

According to the present invention, there are provided compositions comprising a reaction product of an aryl mono- or di-carboxylic acid, e.g., benzoic acid or terephthalic acid, or a reactive derivative thereof and an organic mono- or di-ol e.g., methanol, ethylene glycol or butanediol in combination with a reaction product of phosgene or a reactive derivative thereof and an organic mono- or di-ol, e.g., diphenyl carbonate or poly(bisphenol-A carbonate) stabilized with boric acid. By the term "stabilized" is meant rendered resistant to thermally induced ester interchange reactions.

DESCRIPTION OF THE INVENTION

Any amount of boric acid will stabilize the combination of ester and carbonate. Preferably, however, from about 0.01 parts to about 1.0 parts by weight of boric acid should be used, and most preferably, from about 0.1 parts to about 0.5 parts by weight should be used, based on 100 parts by weight of the total ester and carbonate components in the composition. Although boric acid is, as mentioned, relatively innocuous, amounts larger than about 1.0 parts by weight per 100 parts of component in the combination should be used with caution since such larger amounts will provide melt stability, but might also deliteriously affect the properties of one or more of the esters and/or carbonates in the composition.

Boric acid may be mixed with the esters and carbonates by any suitable means. Since it is a solid, it can be most expeditiously mixed with polyesters and polycarbonates in the form of resins either as a precompounded concentrate, or directly into the melt, e.g., in an extruder.

The esters with which the present invention is concerned, either as simple di-esters, or as polyesters, are reaction products of aryl mono- or di-carboxylic acids, and reactive derivatives thereof, e.g., of the formula:

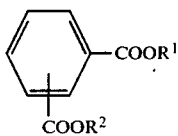

wherein $R^1$ and $R^2$ are, independently, hydrogen, alkyl, aryl, substituted aryl, halo, and the like, with an organic mono- or di-ol, e.g., of the formula:

$R^3$—OH; or

HO—$R^4$—OH wherein $R^3$ is a monovalent organic radical, e.g., alkyl, aryl, substituted aryl, and the like and $R^4$ is a divalent organic radical, such as alkylidene, arylene, substituted arylene, and the like. The carbon content of such radicals can range from 1 to 30 carbon atoms. The substituents on substituted aryl groups can comprise hydrocarbon, hydrocarbonoxy, halogen and the like. The radicals, especially the divalent radicals can be interrupted with hydrocarbon straight chains or branched hydrocarbon radicals, and with heteroatoms and radicals, such as oxygen, nitrogen, phosphorus and the like.

The carbonates with which the present invention is concerned, the di-esters of polyesters of carbonic acid, HOCOOH, e.g., reaction products of phosgene or phosgene precursors of the general formula:

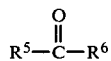

wherein $R^5$ and $R^6$ are, independently halogen, O-alkyl, O-aryl, substituted O-aryl, and the like, with an organic mono- or di-ol, e.g., of the formula:

$R^3$—OH; or

HO—$R^4$—OH wherein $R^3$, and $R^4$, are as defined above. Illustrative radicals of the $R^1$ and $R^2$, $R^3$, $R^5$ and $R^6$ type are methyl, ethyl, 2-ethylhexyl, n-decyl, and the like, phenyl, napthyl, methylphenyl, methoxyphenyl, chlorophenyl, chloro, bromo, and the like. Illustrative radicals of the $R^4$ type are ethylene, 1,4-tetramethylene, p-phenylene, ethyloxyethyl, 2,2'-dimethyl-4,4'-diphenylene, 1,6-cyclohexanedimethylene, 1,4-oxytetramethylene, mixtures of such divalent radicals, and the like.

Generally, all thermoplastic resins made with active catalysts, e.g., titanium or zinc esters, are unstable, and all such resins can be treated with boric acid according to this invention. As indicated above, the polyester resin can be produced from terephthalic acid or a reactive derivative thereof and an alkanediol or cyclohexane dimethanol, such as for example, by processes described in Whinfield and Dickson, U.S. Pat. No. 2,465,319. The polycarbonate resins can be produced from a diphenol and phosgene or a phosgene precursor, such as from a dihydroxy diaryl alkane, e.g., bisphenol-A and phosgene or a diester of carbonic acid, see, e.g., Schnell, et al, Canadian Pat. No. 578,585. The polyacrylate resins used as third resin components in preferred embodiments can be made in known ways, too, and are described in patents such as Brinkmann, et al., U.S. Pat. Nos. 3,591,659; Schlichting, et al., 4,022,748; and Farnham, et al., 4,096,202. In general, they will comprise an alkyl acrylate or methacrylate, e.g., n-butyl acrylate or methyl methacrylate. Preferably, the polyacrylate will comprise a rubbery first stage and a thermoplastic hard final stage. In most preferred embodiments the polyacrylates will be those in which the first stage is comprised of polymerized n-butyl acrylate units or polymerized diene units, e.g., polymerized butadiene units. In any event, such multicomponents blends are more thoroughly described in the above-mentioned Cohen and Dieck, U.S. Pat. No. 4,257,937, which is incorporated herein by reference to avoid unnecessarily detailed description.

Those embodiments of the invention which are melt-stabilized flame retardant thermoplastic polyester/polycarbonate resin compositions are made by including boric acid in compositions rendered flame retardant with an effective amount of a flame retardant polycarbonate additive. Such additives are, for example, bromine- or chlorine-containing homo- co-polycarbonates, e.g., those from tetra-bromobisphenol-A and bisphenol-A, and the like, alone, or preferably combined with a synergist, such as antimony trioxide. The examples which follow will show melt stabilization of a number of simple compounds as well as resinous such compositions according to the present invention.

DESCRIPTION OF THE PREFERRED EMBODIMENTS

The following examples illustrate the present invention, but are not intended to limit the scope of the claims in any manner whatsoever. All parts are by weight unless otherwise specified.

EXAMPLE 1

A mixture of diphenyl carbonate, 1.0 g., 1,4-butylene dibenzoate, 1.0 g., and 1.3 microliters of tetraoctyl titanate was heated at 250° C. for 20 minutes. Analysis of a sample by gas chromotagraphy indicated a ratio of phenyl benzoate to diphenyl carbonate (area %:area %) of 0.4:1 or 29 percent transesterification. The procedure was repeated except that 1.7 mg. of boric acid was added prior to heating. Gas chromatographic analysis showed the ratio of phenyl benzoate to diphenyl carbonate to be 0.037:1 or 3.6 percent. This ten-fold reduction in thermally induced transesterification demonstrates the stabilization effect of boric acid.

EXAMPLE 2

Three thousand grams of poly(1,4-butylene terephthalate resin (General Electric Company VALOX ®315) and 3,000 g. of poly(bisphenol A carbonate) resin were mixed and extruded on a 2½ inch PRODEX extruder at the following conditions: temperature, 500° F. on all zones; vacuum vented, 100 revolutions per minute (RPM) screw speed and 170 lb/hr. feed rate. After heating for 20 minutes at 260° C., the blend had a TM of 203° C. The procedure was exactly repeated, except that 5.4 g. of boric acd was added prior to extrusion. This stabilized blend had a TM of 209° C. after heating 20 minutes at 260° C.

The reduced change in melting point after thermal treatment demonstrates the effectiveness of boric acid as a stabilizer in an admixture of polyester resin and polycarbonate resin.

EXAMPLE 3

Compositions are prepared by co-extruding in a Sterling extruder at 450° F., the following formulations.

| Composition (parts by weight) | 3* | 3 |
| --- | --- | --- |
| Poly(1,4-butylene terephthalate)[a] | 300 | 300 |
| Poly(bisphenol-A carbonate)[b] | 625 | 625 |
| Poly Acrylate Resin[c] | 125 | 125 |
| Antioxidant[d] | 10 | 10 |
| Boric Acid | — | 2.5 |

*Control
[a]General Electric Company, VALOX ® 315
[b]General Electric Company, LEXAN ® 145
[c]Rohm & Haas Acryloid KM-653
[d]Goodrite 3125, antioxidant After heating for 20 minutes at 260° C., the control (3*) had a Tm of 215° C., and the stabilized blend (3) had a Tm of 218° C.

EXAMPLE 4

A flame retardant composition was prepared, molded and tested. The formulation used and the properties obtained were as follows:

| Example | 4A* | 4 |
| --- | --- | --- |
| Composition (parts by weight) | | |
| Poly(1,4-butylene terephthalate) | 33 | 33 |
| Poly(bisphenol-A carbonate) | 20 | 20 |
| Glass fiber reinforcement | 30 | 30 |
| Flame retardant, brominated aromatic polycarbonate and antimony oxide, combined | 16 | 16 |
| Stabilizers/mold release | 1 | 1 |
| Boric acid | — | 0.3 |

After heating for 20 minutes at 20° C., the control (4A*) had a Tm of 182° C. and the stabilized blend (4) had a Tm of 196° C.

The effectiveness of boric acid in reducing the change in melting point after thermal treatment is thus demonstrated.

EXAMPLE 5

The procedure of Example 1 is repeated, substituting 1.0 g. of ethylene dibenzoate for 1,4-butylene dibenzoate. The ratio of phenyl benzoate to diphenyl carbonate after heating at 250° C. for 20 min. was reduced from 0.50:1 to 0.07:1 when 1.3 milligrams of boric acid was added, showing its ability to reduce ester interchange in the presence of an active titanium catalyst.

EXAMPLE 6

The procedure of Example 5 was repeated substituting 1.6 mg. of zinc acetate and 0.3 mg. of antimony oxide for the titanium catalyst. The ratio of phenyl benzoate to diphenyl carbonate after heating at 250° C. for 20 min. was reduced from 0.10:1 to no detectable amount when 1.7 milligrams of boric acid was added, showing its ability to reduce ester interchange in the presence of an active zinc catalyst.

The above-mentioned patents and publications are herein incorporated by reference. Obviously, many variations of the present invention will suggest themselves to those skilled in this art in light of the above, detailed description. For example, instead of poly(1,4-butylene terephthalate) there can be substituted poly(ethylene terephthalate) in a 50:50 admixture with poly(1,4-butylene terephthalate). Instead of poly(1,4-butylene terephthalate) there can be substituted poly (cyclohexanedimethanol terephthalate). The polyacrylate resin having a butadiene base can be omitted from the blend of poly(1,4-butylene terephthalate), and poly (bisphenol-A carbonate) or it can be replaced with one having a poly n-butyl acrylate base. Conventional additives such as glass reinforcement, clay, mica, pigments and colorants all can be added in conventional amounts. All such obvious variations are within the full intended scope of the appended claims.

I claim:

1. A composition comprising the reaction product of an aryl mono- or di-carboxylic acid or a reactive derivative thereof and an organic mono- or di-ol in the presence of an active catalyst in combination with the reaction product of phosgene or a reactive derivative thereof and an organic mono- or di-ol, stabilized against thermally-induced ester interchange reactions with boric acid.

2. A thermoplastic composition comprising a polyester resin derived from terephthalic acid or a reactive derivative thereof and an alkanediol in the presence of an active catalyst in further combination with an aromatic polycarbonate, melt stabilized against thermally-induced ester interchange reactions with boric acid.

3. A composition as defined in claim 1 containing from about 0.01 to about 1 parts by weight of boric acid per 100 parts by weight of said composition.

4. A composition as defined in claim 3 containing from about 0.1 to about 0.5 parts by weight of boric acid per 100 parts by weight of said composition.

5. A composition as defined in claim 2 containing from about 0.01 to about 1 parts by weight of boric acid per 100 parts by weight of said composition.

6. A composition as defined in claim 5 containing from about 0.1 to about 0.5 parts by weight of boric acid per 100 parts by weight of said composition.

7. A composition as defined in claim 1 wherein said reaction product of benzoic acid is 1,4-butylene or ethylene dibenzoate and said reaction product of phosgene is diphenyl carbonate.

8. A composition as defined in claim 2 wherein said reaction product of terephthalic acid is a polyester resin which comprises poly(1,4-butylene terepthalate), poly(ethylene terephthalate), or an admixture thereof, and said reaction product of phosgene comprises an aromatic polycarbonate resin.

9. A composition as defined in claim 8 wherein said aromatic polycarbonate resin is derived from a diphenol and phosgene or a phosgene precursor.

10. A composition as defined in claim 8 wherein the polyester resin comprises poly(1,4-butylene terephthalate) and the polycarbonate resin comprises poly (bisphenol-A carbonate).

11. A composition as defined in claim 8 which also includes a polyacrylate resin.

12. A composition as defined in claim 11 wherein the polyacrylate resin comprises a multiple stage polymer having a rubbery first stage and a thermoplastic hard final stage.

13. A composition as defined in claim 12 wherein the rubbery first stage is comprised of polymerized butadiene units.

14. A composition as defined in claim 2 wherein the aromatic polycarbonate comprises a brominated- or chlorinated- aromatic polycarbonate and is present in an amount at least sufficient to render said composition flame-retardant.

15. A composition comprising the reaction product of an aryl mono- or di-carboxylic acid or a reactive derivative thereof and an organic mono- or di-ol in the presence of an active catalyst selected from titanium ester catalysts or zinc ester catalysts in combination with the reaction product of phosgene or a reactive derivative thereof and an organic mono- or di-ol, stabilized against thermally-induced ester interchange reactions with boric acid.

16. A thermoplastic composition comprising a polyester resin derived from terphthalic acid or a reactive derivative thereof and an alkanediol in the presence of an active catalyst selected from titanium ester catalysts or zinc ester catalysts in further combination with an aromatic polycarbonate, melt stabilized against thermally-induced ester interchange reactions with boric acid.

* * * * *